(12) United States Patent
Ramakrishnan et al.

(10) Patent No.: US 10,277,530 B2
(45) Date of Patent: Apr. 30, 2019

(54) ALLOCATING PORTIONS OF A SHARED NETWORK RESOURCE BASED ON CLIENT DEVICE GROUPS

(71) Applicant: Cisco Technology, Inc., San Jose, CA (US)

(72) Inventors: Sangeeta Ramakrishnan, Saratoga, CA (US); Xiaoqing Zhu, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/865,673

(22) Filed: Jan. 9, 2018

(65) Prior Publication Data

US 2018/0131632 A1    May 10, 2018

Related U.S. Application Data

(63) Continuation of application No. 14/339,670, filed on Jul. 24, 2014, now Pat. No. 9,894,010.

(51) Int. Cl.
| | |
|---|---|
| *G06F 15/173* | (2006.01) |
| *G06F 15/16* | (2006.01) |
| *H04L 12/911* | (2013.01) |
| *H04L 12/24* | (2006.01) |
| *H04L 29/06* | (2006.01) |
| *H04L 29/08* | (2006.01) |

(52) U.S. Cl.
CPC ........ *H04L 47/783* (2013.01); *H04L 41/0896* (2013.01); *H04L 41/5067* (2013.01); *H04L 65/00* (2013.01); *H04L 65/102* (2013.01); *H04L 65/4084* (2013.01); *H04L 65/80* (2013.01); *H04L 67/02* (2013.01); *H04L 67/104* (2013.01); *H04L 67/322* (2013.01)

(58) Field of Classification Search
CPC .............. H04L 41/0896; H04L 47/783; H04L 41/5067; H04L 67/322
USPC .................................. 709/202–203, 225–226
See application file for complete search history.

(56) References Cited

U.S. PATENT DOCUMENTS

| | | | |
|---|---|---|---|
| 8,103,777 B2 * | 1/2012 | Verhaegh | .......... G06F 17/30209 709/226 |
| 8,301,794 B2 | 10/2012 | Salomons | |
| 8,332,517 B2 | 12/2012 | Russell | |

(Continued)

*Primary Examiner* — Bharat Barot
(74) *Attorney, Agent, or Firm* — Merchant & Gould P.C.

(57) ABSTRACT

Various implementations disclosed herein enable client devices to share a network resource in order to produce more evenly distributed perceptual playback quality levels within each subscription tier. Sharing of a network resource is facilitated by providing client devices with one or more QoE distribution indicator values, which enables client device participation in the allocation of the network resource. In some implementations, a client device method includes determining a local QoE level value, and then modifying a representation selection of media content data based on the local QoE and one or more QoE distribution indicator values. The local QoE level value characterizes perceptual playback quality of media content data received by the client device using the shared network resource. The QoE distribution indicator values characterize at least in part the relative QoE values associated with a plurality of client devices sharing the shared network resource with the client device.

20 Claims, 9 Drawing Sheets

(56) References Cited

U.S. PATENT DOCUMENTS

| | | | |
|---|---|---|---|
| 8,706,841 B2 * | 4/2014 | Gordon | H04N 21/2665 709/203 |
| 8,732,274 B2 | 5/2014 | Bouazizi et al. | |
| 9,009,804 B2 * | 4/2015 | Abrams | H04L 67/42 709/203 |
| 9,241,166 B2 | 1/2016 | Konda et al. | |
| 9,479,562 B2 | 10/2016 | Funge et al. | |
| 2004/0204073 A1 * | 10/2004 | Yanosy | H04M 1/72525 455/557 |
| 2007/0083657 A1 * | 4/2007 | Blumenau | G06F 9/468 709/226 |
| 2010/0185753 A1 | 7/2010 | Liu et al. | |
| 2013/0073360 A1 | 3/2013 | Caplan et al. | |
| 2014/0250229 A1 | 9/2014 | Prokopenko et al. | |
| 2015/0334157 A1 | 11/2015 | Oyman et al. | |
| 2016/0014199 A1 | 1/2016 | Dunne et al. | |
| 2016/0050246 A1 | 2/2016 | Liao et al. | |
| 2016/0180259 A1 * | 6/2016 | Marianko | H04L 67/10 705/5 |
| 2017/0223747 A1 * | 8/2017 | Padden | H04W 72/10 |

\* cited by examiner

ALLOCATING PORTIONS OF A SHARED NETWORK RESOURCE BASED ON CLIENT DEVICE GROUPS

CROSS-REFERENCE TO RELATED APPLICATIONS

This application is a continuation of and claims priority to U.S. patent application Ser. No. 14/339,670, filed on Jul. 24, 2014, now U.S. Pat. No. 9,894,010, which is hereby incorporated by reference in its entirety.

TECHNICAL FIELD

The present disclosure relates to data networks, and in particular, to enabling distributed management of shared network resources based on contextual quality indicators.

BACKGROUND

In accordance with known network management methods nominal levels of bandwidth are allocated to client devices. Allocations are often made based on a subscription tier model, within which client devices in each tier receive a respective bandwidth allocation for a corresponding cost. Known quality of service (QoS) metrics for these methods are merely based on assessing whether client devices are provided with data throughput levels associated with the subscription tiers. However, perceptual playback quality of media content data can vary within a subscription tier bandwidth allocation based on characteristics of the media content data. Known network management methods do not manage shared network resources in order to influence perceptual playback quality of media content data items at a client device.

Rather, known methods of managing perceptual playback quality are typically performed by individual client devices. For example, according to adaptive bit rate (ABR) methods, each ABR-enabled client device individually detects and seizes additional available bandwidth, without regard to any substantial gains in perceptual playback quality. Thus, during video streaming, an ABR-enabled client device requests a higher bit-rate representation of a video stream after detecting newly available bandwidth. Bandwidth is misappropriated when the higher bit-rate representation fails to provide a substantial gain in perceptual playback quality. The problem is reinforced by previously known methods in at least three ways. First, newly available bandwidth is claimed on a first-come-first-served basis, which penalizes client devices that cannot or do not act first. Second, existing network management methods fail to regulate client devices that are each operating to individually consume as much of a shared network resource as is available. Third, previously known methods prevent client devices from cooperatively sharing network resources. Consequently, individual client devices are often able to misappropriate portions of shared network resources in a way that has a negative impact on and/or limits the perceptual playback quality of media content on other client devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
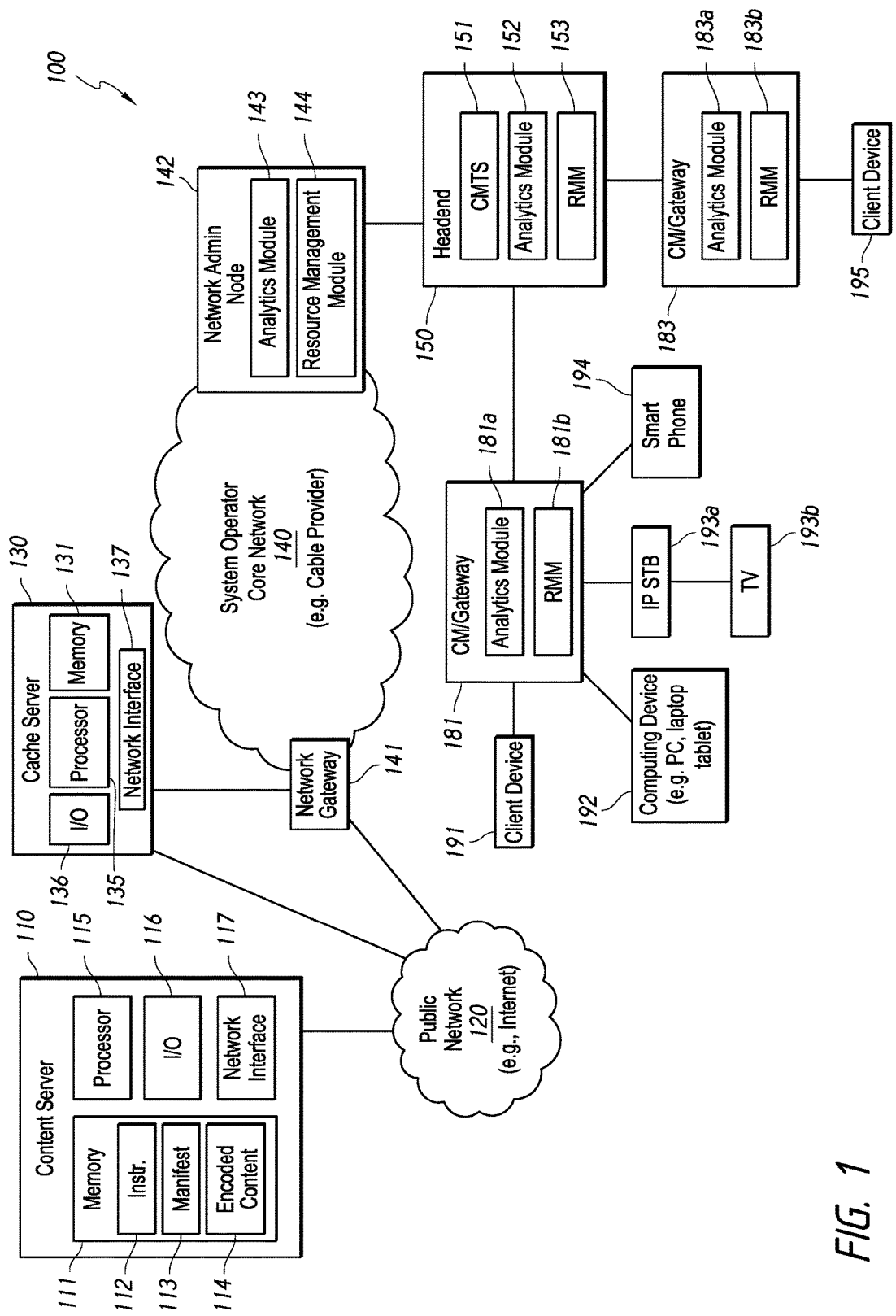
FIG. 1 is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Previously known network management methods and client device methods of managing perceptual playback quality prevent client devices from cooperatively sharing network resources. Instead previously known methods reinforce vigorous competition that results in an uneven distribution of measurable perceptual playback quality amongst client devices that share one or more network resources. By contrast, various implementations disclosed herein enable client devices to cooperatively share one or more network resources in order to produce more evenly distributed perceptual playback quality levels within each subscription tier. In some implementations, cooperative sharing of one or more network resources is facilitated by providing client devices with one or more quality of experience (QoE) distribution indicator values, which enables client device participation in the allocation of shared network resources. For example, in some implementations, a client device method includes determining a local QoE level value, and then modifying a representation selection of media content data based at least on a combination of the local QoE and the one or more QoE distribution indicator values. The local QoE level value quantitatively characterizes perceptual playback quality of a representation of media content data received by the client device using a shared network resource. And the one or more QoE distribution indicator values characterize at least in part the relative QoE values associated with a plurality of client devices sharing the shared network resource with the client device.

FIG. 1 is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes a public network 120 (e.g., a portion of the Internet), a system operator core network 140 (hereinafter "core network 140"), a content server 110, a cache server 130, and a headend node 150. The data communication environment 100 also includes subscriber gateway devices 181, 183 and a number of client devices 191, 192, 193a, 193b, 194, 195.

In some implementations, the core network 140 includes a private and/or subscription-based network. The core network 140 includes any LAN and/or WAN, such as an intranet, an extranet, a virtual private network, and/or portions of the Internet. In some implementations, the core network 140 provides communication capability between any one of the client devices 191, 192, 193a, 193b, 194, 195 and one or more third party service providers and/or content providers (e.g., content server 110, cache server 130, etc.). In some implementations, the core network 140 provides communication capability between any one of the client devices 191, 192, 193a, 193b, 194, 195 and one or more private content servers, storage devices, gateways and/or service servers (not shown), as well as core network provided services and content. In some implementations, the core network 140 uses HyperText Transport Protocol (HTTP) to transport information using the Transmission Control Protocol/Internet Protocol (TCP/IP). HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. The term "resource" in this specification refers to information, devices, infrastructure, and services. A resource includes, for example, bandwidth, processor time, data storage, data structures, non-transitory memory, images, video streams, network transactions, and computational objects. In various implementations, the core network 140 includes a combination of computing devices, switches, routers, server systems, enterprise memory, and data connections.

As shown in FIG. 1, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches and routers. For the sake of brevity and convenience of explanation, the gateway node 141 is described herein as a single entity.

The core network 140 also includes a network administration node 142 or the like, which is arranged to monitor and/or manage one or more headend nodes. Similar to the gateway node 141, the network administration node 142 is illustrated as single entity (e.g., a server, virtual machine, etc.) in FIG. 1. In various implementations, however, the network administration node 142 is provided as a distributed system including a suitable combination of software, data structures, virtual machines, computing devices, servers, switches and routers. Accordingly, the network administration node 142 is described herein as a single entity merely for the sake of brevity and convenience of explanation.

In some implementations, the network administration node 142 includes at least one of an analytics module 143 and a resource management module 144. In some implementations, the analytics module 143 is provided to generate one or more shared-resource traffic quality indicator values, such as an aggregate QoE metric characterizing a distribution of QoE levels for the client devices sharing the one or more shared network resources (e.g., one or more QoE distribution indicator values). As described below, the resource management module 144 is configured to enable network-centric concerted management of respective levels of perceptual playback quality of media content data for a number of client devices sharing one or more network resources; and/or, to enable client devices to cooperatively participate in the allocation and consumption of the one or more network resources in order to produce more evenly distributed perceptual playback quality levels within each subscription tier. The respective levels perceptual playback quality are managed by adjusting client device demand for one or more shared network resources. Adjustments made by individual client devices and are at least based on a local QoE metric in relation to an aggregate QoE metric characterizing QoE for a number of client devices sharing the one or more network resources. In some implementations, the resource management module 144 is configured to provide the one or more shared-resource traffic quality indicator values, such as an aggregate QoE metric and/or an aggregate QoE distribution, to each of a number of client devices that share one or more network resources. The analytics module 143 and the resource management module 144 are not limited to implementation in or proximate to the network administration node 142. In various implementations, modules similar to one or both are included in headend nodes or other bottleneck points. For example, in some implementations, modules similar to one or both are included in one or more of a mobile network, a mobile packet core, a WiF access point, a cable modem and a residential gateway device.

The headend node 150 is coupled to the network administration node 142 and/or one or more other portions of the core network 140. In some implementations, the headend node 150 is capable of data communication using the public network 120 and/or other private networks (not shown). Those of ordinary skill in the art will appreciate that a headend node is typically configured to deliver cable TV, cable modem services and/or various other data services to subscriber client devices. To that end, a headend node includes a suitable combination of software, data structures, virtual machines, routers, switches and high-availability servers. For example, the headend node 150 includes a cable modem termination server (CMTS) 151 that is used to service an allocation of bandwidth shared by a number of client devices. The CMTS 151 includes a suitable combination of hardware, software and firmware for terminating one or more data channels associated with a number of client devices within the shared allocation of bandwidth. In some implementations, the headend node 150 includes at least one of an analytics module 153 and a resource management module (RMM) 154. As described below with reference to FIG. 2, the analytics module 153 is configured to generate one or more shared-resource traffic quality indicator values associated with the traffic on bandwidth available through and managed by the headend node 150. In some implementations, the resource management module 154 is configured to provide the one or more shared-resource traffic quality indicator values, such as an aggregate QoE metric and/or an aggregate QoE distribution, to each of a number of client devices that share one or more network resources available through the headend node 150. Further, while the analytics module 153 and the resource management module 154 are shown as distinct modules, in some implementations, some or all of the functions of each are incorporated into a CMTS or the like.

Client devices access network resources, services and content offerings from a respective headend node through subscriber gateway devices. For example, as shown in FIG. 1, the subscriber gateway devices 181, 183 are coupled to the headend node 150, and thus share bandwidth (and/or other resources) available through the headend node 150. In various implementations, a subscriber gateway device includes, without limitation, devices such as cable modems (CM), wireless access points, and Ethernet modems.

Each subscriber gateway device 181, 183 is accessible by and services a number of client devices. For example, the client device 195 is coupled to the subscriber gateway device 183. Similarly, the subscriber gateway device 181 is coupled to and delivers services and/or content to a client device 191, a computing device 192, a smartphone 194, and an IP set-top box (STB) 193a (which in turn is coupled to TV 193b). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 195. Thus, in this example, the total bandwidth available from the headend node 150 is ultimately shared by five client devices 191, 192, 193a/b, 194 and 195. Those of ordinary skill in the art will appreciate from the present disclosure that, in various implementations, a headend node can be connected to any number and combination of gateway nodes and client devices, and FIG. 1 is merely an example provided to discuss aspects of various implementations.

In some implementations, a subscriber gateway device is configured to manage access and/or assist in the management of network resources available through the subscriber gateway device to corresponding client devices. To that end, for example, the subscriber gateway device 181 includes an analytics module 181a and a resource management module 181b. In the example shown in FIG. 1, the analytics module 181a and the resource management module 181b are provided, individually or in combination, to manage access or assist in the management of network resources available to the client devices 191, 192, 193a/b, and 194. In some implementations, each of the analytics module 181a and the resource management module 181b include one or more respective functions of the corresponding the analytics modules 143, 152 and the resource management modules 144, 153 discussed above and below. Similarly, the subscriber gateway device 183 includes an analytics module 183a and a resource management module 183b.

With continued reference to FIG. 1, the content server 110 is configured to store and provide media content data. To that end, the content server 110 typically includes a non-transitory memory 111, a processor 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

Figure 4:
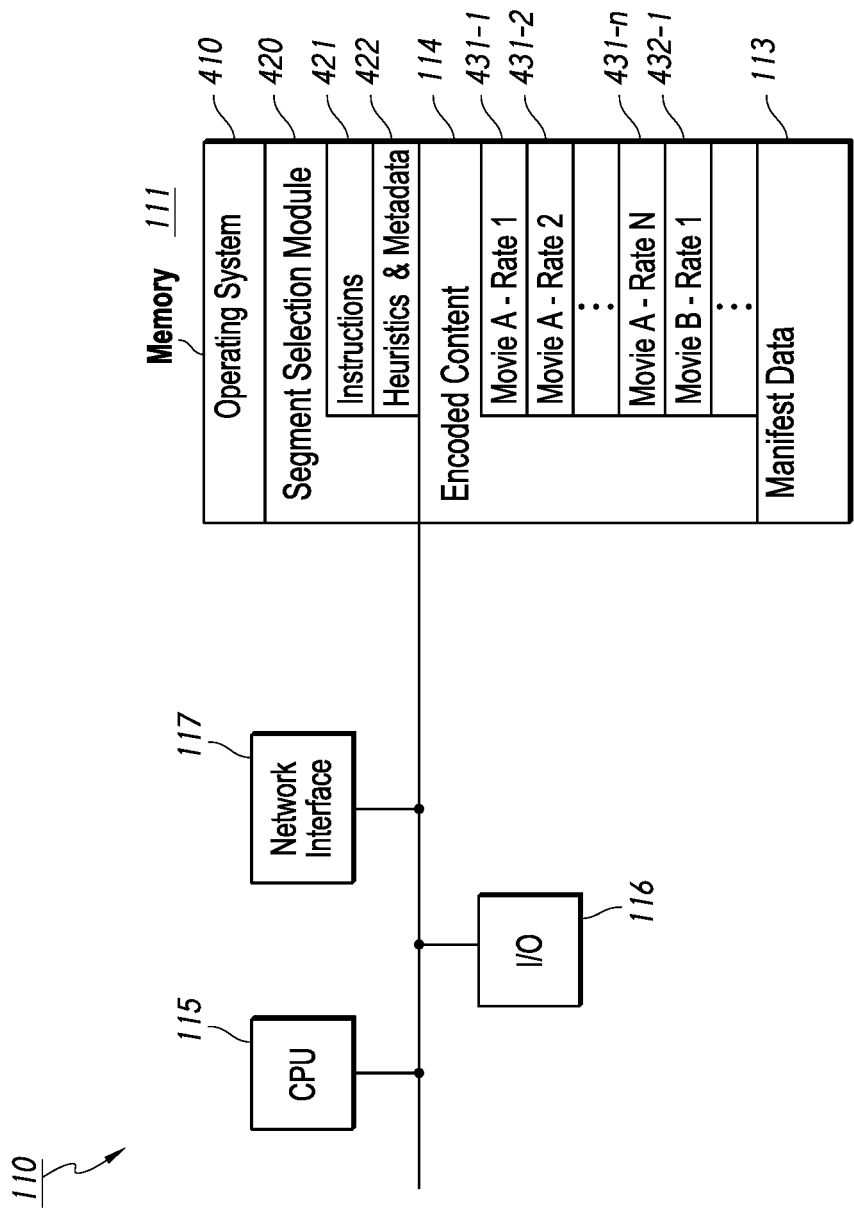
FIG. 4 is a block diagram of an example of a content server system in accordance with some implementations.

FIG. 4 is a block diagram of an example implementation of the content server system 110 of FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the content server system 110 includes one or more processing units (CPU's) 115, a network interface 117, a memory 111, and a local I/O interface 116. The memory 111 includes an operating system 410, which includes implementations of procedures for handling various basic system services and for performing hardware dependent tasks.

With reference to FIGS. 1 and 4, the memory 111 includes instructions 112 (421 in FIG. 4), a manifest 113 and encoded media content data 114. With reference to FIG. 1, in some implementations, the instructions 112 enable the selection of one or more encoding rate representations and/or one or more temporal segments of a media content data item in response to a request from a client device. With reference to FIG. 4, in some implementations the content server 110 also includes a segment selection module 420. The segment selection module 420 includes instructions 421 and heuristics and metadata 421. In some implementations, the instructions 421 in combination with the heuristics and metadata 421 enable the selection of one or more encoding rate representations and/or one or more temporal segments of a media content data item in response to a request from a client device. In some implementations, the encoded media content data 114 includes multiple representations of each of one or more media content data items. As an example, as shown in FIG. 4, the encoded media content data 114 includes data representing two movies, namely Movie A and Movie B, as example media content data items. Those of ordinary skill in the art will appreciate from the present disclosure that various other types of media content data include without limitation sports video, newscasts, music and concert videos, and various other types of TV programs, audio files and video games. Encoded content 114 includes multiple representations 431-1, 431-2, . . . , 431-n of Movie A, that are each encoded at a different bit rate than the other representations. Similarly, one of many representations of Movie B, indicated by 432-1, is also illustrated in furtherance of the example. In some implementations, a representation of a media content data item is divided into one or more temporal segments, each of which is available at one or more encoding rates. In some implementations, the manifest 113 includes metadata associated with each of the encoding rate representations and/or the temporal segments of the one or more media content data items. For example, the manifest 113 includes at least one of a respective encoding rate indicator, a quality level indicator, and a duration indicator for each representation of the one or more media content data items. In some implementations, a quality level indicator is explicitly indicated (e.g., as opposed to being inferred from the encoding bit rate), with the explicit indication corresponding to a perceptual playback quality metric such as mean square error (MSE), peak signal-to-noise ratio (PSNR), mean opinion score (MOS), relative degradation, or other well-known quality metrics. In some implementations, a quality level indicator includes a respective QoE metric associated with a temporal segment of a representation of a media content data item, characterized by a particular encoding rate.

The cache server 130 is configured to provide replicas of at least some of the media content data and associated metadata stored and provided by the content server 110. In various implementations, the cache server 130 is similarly configured to the content server 110, and includes, without limitation, a processor 135, a non-transitory memory 131, a network interface 137, and I/O interface 136. In some implementations, a request for media content data item from a client device is initially directed to or redirected to the cache server 130, when the cache server 130 is closer to the client device than the content server 100. The cache server 130 can also be used to supplement the content server 110 during times of excessive traffic.

Although FIG. 1 illustrates a number of discrete elements, FIG. 1 is intended to highlight various aspects of a network rather than to serve as a schematic strictly indicative of various network implementations. Thus, in various implementations, a network includes a subset or superset of the elements illustrated in FIG. 1. As such, a combination of elements could be implemented by a single element and some singular elements could be implemented by one or more elements. The number of elements and how various features and functions are allocated can vary between implementations, and may depend in part on the amount of traffic a network is configured to handle during various usage periods (e.g., peak, average, low, etc.).

In operation, various encoding rate representations of media content data items can be provided to client devices (e.g., client device 191) in a number of ways. For example, in ABR-enabled systems, a media content item (e.g., a particular movie, sportscast, etc.) is typically sub-divided into temporal segments (e.g., 2-10 seconds long) that are each encoded at respective bit rates. To that end, multiple representations of each segment are stored and made available by the content server 110 to client devices. The encoding bit rate of each segment representation in part characterizes the perceptual playback quality of the segment representation. Since each representation of a segment is encoded at a different bit rate, each representation has a different amount of data, and thus uses a different combination of bandwidth and/or time for transmission. Additionally, a variety of storage structures can be used for ABR media content data, such as directories with individual files for each segment, standardized file formats, and/or custom packaging schemes. In some implementations, the structure of the media content data, along with associated metadata associated with each segment, is contained in a separate structure, referred to above as a manifest (e.g., manifest data 113 in FIGS. 1 and 4). In some implementations, manifest data 113 also includes a respective quality level indicator that explicitly indicates the perceptual playback quality of each segment representation. More specifically, in some implementations, a quality level indicator provides a quantitative characterization of the perceptual playback quality of a segment representation for a client device that has the playback capability to achieve the indicated level of quality. As noted above, various quality level indicators include, without limitation, metrics such as mean square error (MSE), peak signal-to-noise ratio (PSNR), mean opinion score (MOS), relative degradation, or other well-known quality metrics.

An ABR-enabled client device selects and transmits a request (e.g., a HTTP GET command) for a specific segment representation from the content server 110. The selection decision is based on various parameters including the subscription tier bandwidth allocated to the client device and the amount of data currently residing in a playout buffer of the client device. As noted above, in accordance with previously known ABR client device methods, there is a general bias towards enabling a client device to consume as much bandwidth as is available to the client device. As a result, an ABR-enabled client device typically operates to select representations of segments with high encoding rates so that the client device consumes the bandwidth allocated to it based on an associated subscription tier. The typical ABR-enabled client device is also biased towards consuming bandwidth in excess of the allocation provided under the associated subscription tier when additional bandwidth becomes available.

Such previously known ABR methods are provided to increase utilization of bandwidth and/or other resources. A drawback of these methods is that they do not consider or determine whether actual perceptual quality of experience improvements, if any, achieved by an ABR-enabled client device justify the bias towards consuming available bandwidth. For example, a client device may select a 10 Mbps representation of a video stream segment over a 6 Mbps representation of the same video stream segment. However, depending on the content of the video stream segment (e.g., a movie scene with fast moving action versus a scene with mainly dialogue and little movement), the end user may not perceive an appreciable difference in playback quality. Without such an appreciable difference, the additional 4 Mbps bandwidth (or equivalently time) used to receive the 10 Mbps segment representation is misused, and could be utilized more productively. Additionally, a specified level of perceptual playback quality for a segment representation is often based on the playback capability of a client device. So for example, a first client device may only be capable of displaying video at a resolution of 720 p, while a second client device is capable displaying video at a resolution of 1080 p. If the first client device is not prevented from selecting the higher rate representation, as would be the cased with an ABR-enabled client device, the first client device would effectively misuse or misappropriate bandwidth from the second client device and/or other client devices by selecting the higher rate representation.

By contrast, as provided by some implementations, a more effective use of available bandwidth includes limiting the first client device to a segment representation with a resolution of 720 p as opposed to 1080 p, because the difference in playback quality cannot be realized on the first client device. To that end, more generally, various implementations enable client devices to cooperatively participate in the allocation and consumption of the one or more network resources in order to produce more evenly distributed perceptual playback quality levels among client devices within each subscription tier. For example, some implementations include a method of modifying bit-rate representation selection by a client device using the QoE performance of the client device relative to the QoE performance of other client devices sharing the network resource. In another example, some implementations, include separately managing client devices that are configured to cooperatively participate in the allocation and consumption of the one or more network resources from client devices that are not so configured.

For example, first and second client devices are allocated respective bandwidth allocations over a shared link by a resource management module (e.g., resource management module 153). The first and second client devices are configured to operate within the respective bandwidth allocations, and are configured to request content streams at bit rates such that each stream does not exceed the respective bandwidth allocation. The first and second client devices are each initially assigned respective bandwidth allocations of 4 Mbps on a shared link having a total of 8 Mbps bandwidth. In furtherance of this example, the first client device is operating to receive a sports video stream (i.e., characterized by rapid pixel changes), and the second client device is operating to receive a newscast video stream (i.e., characterized by slow pixel changes). The sports video stream may be available at three bit rates, 8 Mbps stream with good quality video, 6 Mbps with acceptable quality video, and 4 Mbps stream with poor quality video. The newscast video stream may also be available in three bit rates, 8 Mbps stream with excellent quality video, 6 Mbps stream with excellent video quality (the 8 Mbps stream being insubstantially better than 6 Mbps stream in terms of quality), 4 Mbps stream with good quality video, and 2 Mbps with acceptable quality video. In accordance with some implementations, the first and second devices are provided with one or more QoE distribution indicator values that enable both devices to cooperatively consume the available bandwidth in order to improve aggregate QoE, equalize QoE, and/or prevent the QoE for each device from breaching a floor value of quality (e.g., not less that "acceptable" video quality).

Figure 2:
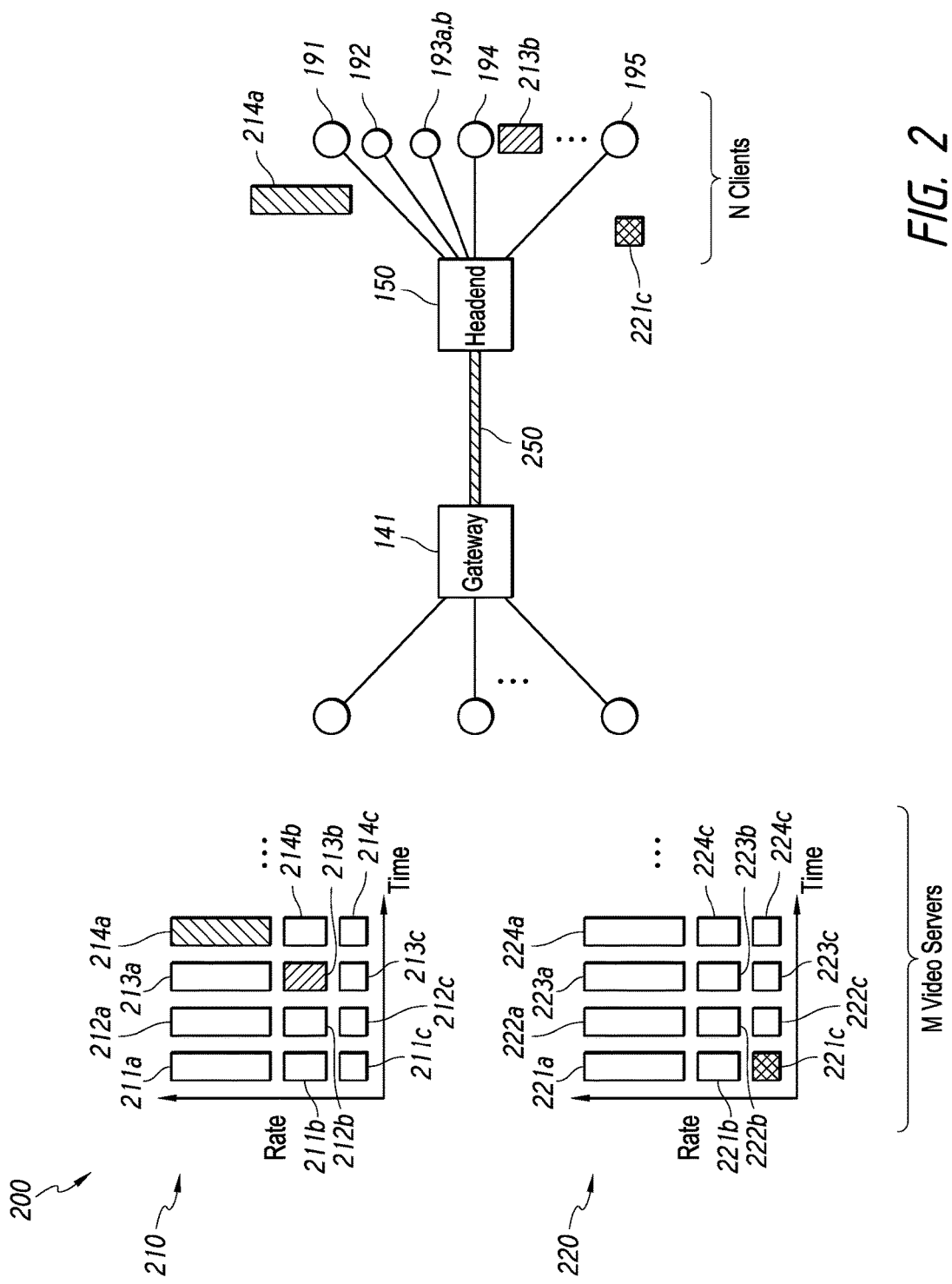
FIG. 2 is a block diagram of a data link congestion model in accordance with some implementations.

FIG. 2 is a block diagram of a data link congestion model 200 that illustrates the issues described above. The data link congestion model 200 shown in FIG. 2 is similar to an adapted from the data communication environment 100 provided in FIG. 1. Elements common to FIGS. 1 and 2 include common reference numbers, and only the differences between FIGS. 1 and 2 are described herein for the sake of brevity. To that end, the congestion model 200 includes a link 250 providing a shared allocation of bandwidth between the gateway node 141 and headend node 150. The headend node 150 is ultimately coupled to the five client devices 191, 192, 193a/b, 194 and 195. Thus, in this example and in FIG. 1, the total bandwidth available through the headend node 150 on link 250 is ultimately shared by the five client devices 191, 192, 193a/b, 194 and 195.

The congestion model 200 in FIG. 2 also includes first and second media content data items 210, 220 stored at M video servers (not shown). The first media content data item 210 includes a first set of segment representations 211a,b,c, a second set of segment representations 212a,b,c, a third set of segment representations 213a,b,c, and a fourth set of segment representations 214a,b,c. The first set of segment representations 211a,b,c includes segment representations for a first temporal segment of the first media content data item 210. Similarly, the second, third and fourth sets of segment representations (212a,b,c, 213a,b,c, 214a,b,c) are for respective second, third and fourth temporal segments of the first media content data item 210. The second media content data item 220 includes a first set of segment representations 221a,b,c, a second set of segment representations 222a,b,c, a third set of segment representations 223a,b,c, and a fourth set of segment representations 224a,b,c. The first, second, third and fourth sets of segment representations (221a,b,c, 222a,b,c, 223a,b,c, 224a,b,c) are for respective first, second, third and fourth temporal segments of the second media content data item 220.

In operation, the five client devices 191, 192, 193a/b, 194 and 195 are each able to select segment representations. In some implementations, a client device selects a temporal segment based on a respective portion of the bandwidth on link 250 allocated to the client device. For example, as shown in FIG. 2, the client device 191 selects segment representation 214a, corresponding to the highest encoding rate available for the fourth temporal segment of the first media content data item 210. The client device 194 selects segment representation 213b, corresponding to the middle encoding rate available for the third temporal segment of the first media content data item 210. And, the client device 195 selects segment representation 221c, corresponding to the middle encoding rate available for the third temporal segment of the second media content data item 220. Additionally, in ABR-enabled implementations, a client device is able to exceed the bandwidth allocated to it when other portions of the bandwidth on link 250 are underutilized, and thus select segment representations with higher encoding rates that are normally supported by the bandwidth nominally allocation to the client device.

Client devices generally include any suitable computing device, such as a computer, a laptop computer, a tablet device, a netbook, an interne kiosk, a personal digital assistant, a mobile phone, a smartphone, a gaming device, a computer server, etc. In some implementations, each client device includes one or more processors, one or more types of memory, a display and/or other user interface components such as a keyboard, a touch screen display, a mouse, a track-pad, a digital camera and/or any number of supplemental devices to add functionality. As an example, FIG. 3, a block diagram of a configuration of a client device 300 in accordance with some implementations. While pertinent features are illustrated, those of ordinary skill in the art will appreciate from the present disclosure that various other features have not been illustrated for the sake of brevity and so as not to obscure more pertinent aspects of the example implementations disclosed herein.

In some implementations, the client device includes a suitable combination of hardware, software and firmware configured to provide at least some of protocol processing, modulation, demodulation, data buffering, power control, routing, switching, clock recovery, amplification, decoding, and error control. In some implementations, at least a portion of the control module and at least a portion of the plurality of optical communication devices are provided on a first substrate. For example, the client device 300 includes a communication interface 302. In some implementations, the communication interface 302 is suitable for communication over, among others, an IP network, a coaxial cable network, an HFC network, and/or wireless network. The communication interface 302 is coupled to a demultiplexer (demux) 304. The demux 304 is configured to parse the metadata (e.g., in the packet header or in the manifest) of segment representations and the body or payload data of the same. Metadata includes, for example, timestamp information, packet identifiers, program numbers, quality level, and/or other information useful for decoding and utilizing a received segment representation. The segment data and metadata information is provided to a media engine 306 as explained further below.

Although client device 300 is described in the context of various internet video streaming implementations, such as IPTV and VoD, the client device 300 may comprise additional and/or different components in various other implementations. For instance, in some implementations, the client device 300 includes a tuner system (e.g., radio frequency tuning, not shown) coupled to communication interface 302. In some implementations, a tuner system includes one or more tuners for receiving transport streams received via communication interface 302. Additionally and/or alternatively, in some implementations, a demodulator is employed to demodulate the received carrier signal and the demux 304 is configured to parse the transport stream packets of one or more defined carrier frequencies.

Figure 3:
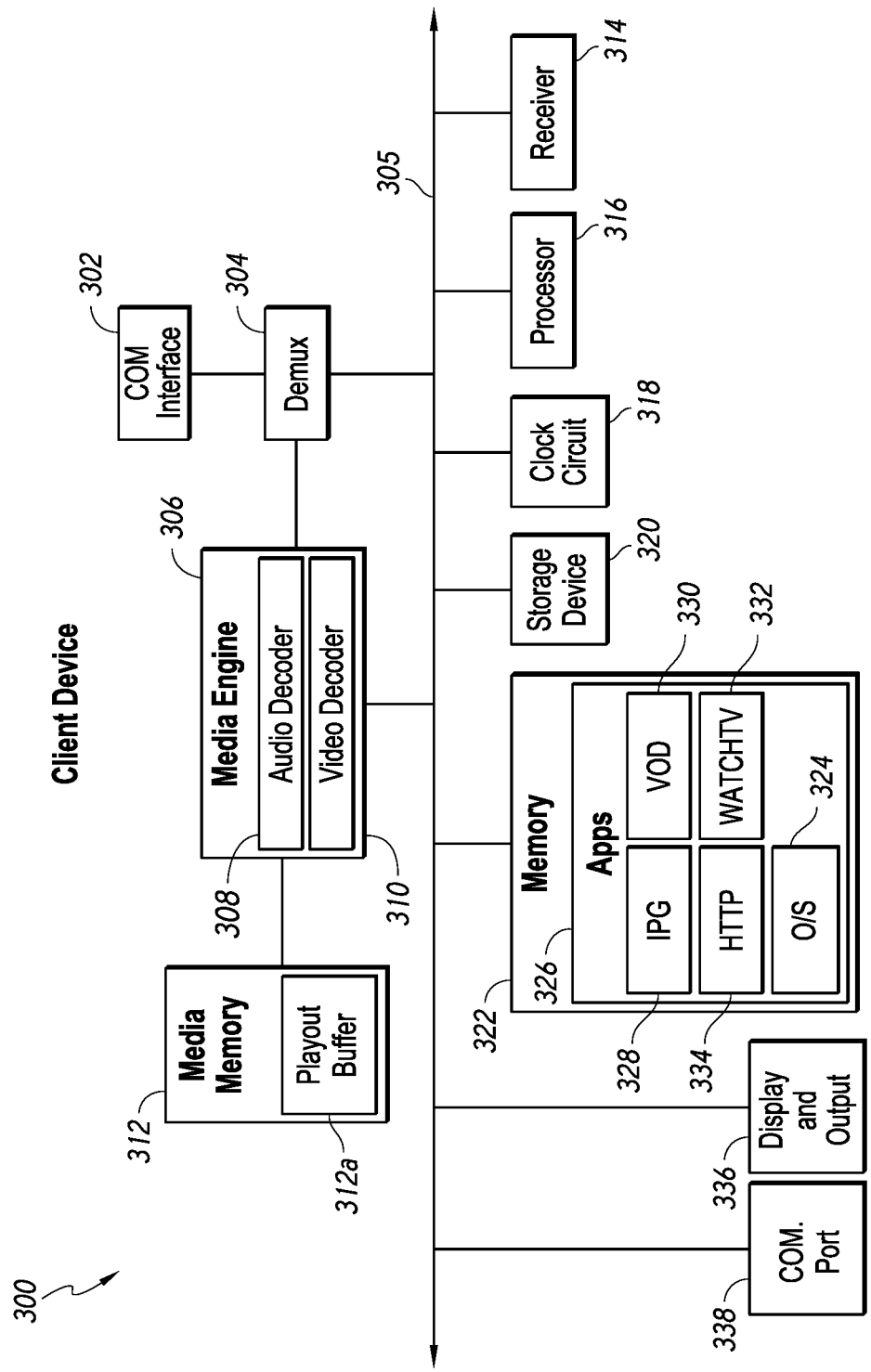
FIG. 3 is a block diagram of an example of a client device in accordance with some implementations.

As shown in FIG. 3, the demux 304 is coupled to a bus 305 and to media engine 306 (i.e. an audio/video (A/V) processing or decoding device). The media engine 306 includes decoding logic including, for example, at least one of an audio decoder 308 and a video decoder 310. The media engine 306 also includes buffer management functionality to facilitate a determination as to current buffer level within the client device 300. The media engine 306 is further coupled to bus 305 and to a media memory 312. The media memory 312 includes one or more buffers (e.g. playout buffers) for temporarily storing compressed and/or reconstructed pictures and/or audio frames. In some implementations, the buffers of media memory 312 and/or other buffers (e.g., network buffers) reside in other memory devices, or distributed among media memory 312 and memory 322.

In some implementations, the client device 300 includes additional components coupled to bus 305. For example, the client device 300 also includes a receiver 314 configured to receive user input. In some implementations, the client device 300 includes a processor 316 for executing and managing operations of the client device 300. In some implementations, the client device 300 includes a clock circuit 318 comprising phase and/or frequency locked-loop circuitry (or software, or combination of hardware and software) configured to synchronize clock information received in an audio, video, or A/V stream to facilitate decoding operations and to clock the output of reconstructed audiovisual content.

In some implementations, the client device 300 also includes a storage device 320 (and associated control logic) provided to temporarily store buffered content and/or to more permanently store recorded content. The memory 322 includes at least one of volatile and/or non-volatile memory, and is configured to store executable instructions or computer code associated with an operating system (O/S) 324, one or more applications 326 (e.g., an interactive programming guide (IPG) 328, a video-on-demand (VoD) app 330, a WatchTV app 332 (associated with broadcast network TV), HTTP logic 334, among other applications such as pay-per-view, music, personal video recording (PVR), driver software, etc. In some implementations, profile selection logic includes HTTP client functionality, and may generate requests for segment representation from a content server (e.g., content server 110).

The client device 300 may be further configured with display and output logic 336, as indicated above that may include graphics and video processing pipelines, among other circuitry to process the decoded pictures and associated audio and provide for presentation (e.g., display) on, or associated with, a display device or other media device. A communications port 338 (or ports) may further be included in the client device 300 for receiving information from and transmitting information to other devices. For instance, communication port 338 may feature USB (Universal Serial Bus), Ethernet, IEEE-1394, serial, and/or parallel ports, etc. In addition, communications port 338 may be configured for home networks (e.g., HPNA/MoCA, etc.). The client device 300 may also include an analog video input port for receiving analog video signals.

Figure 5:
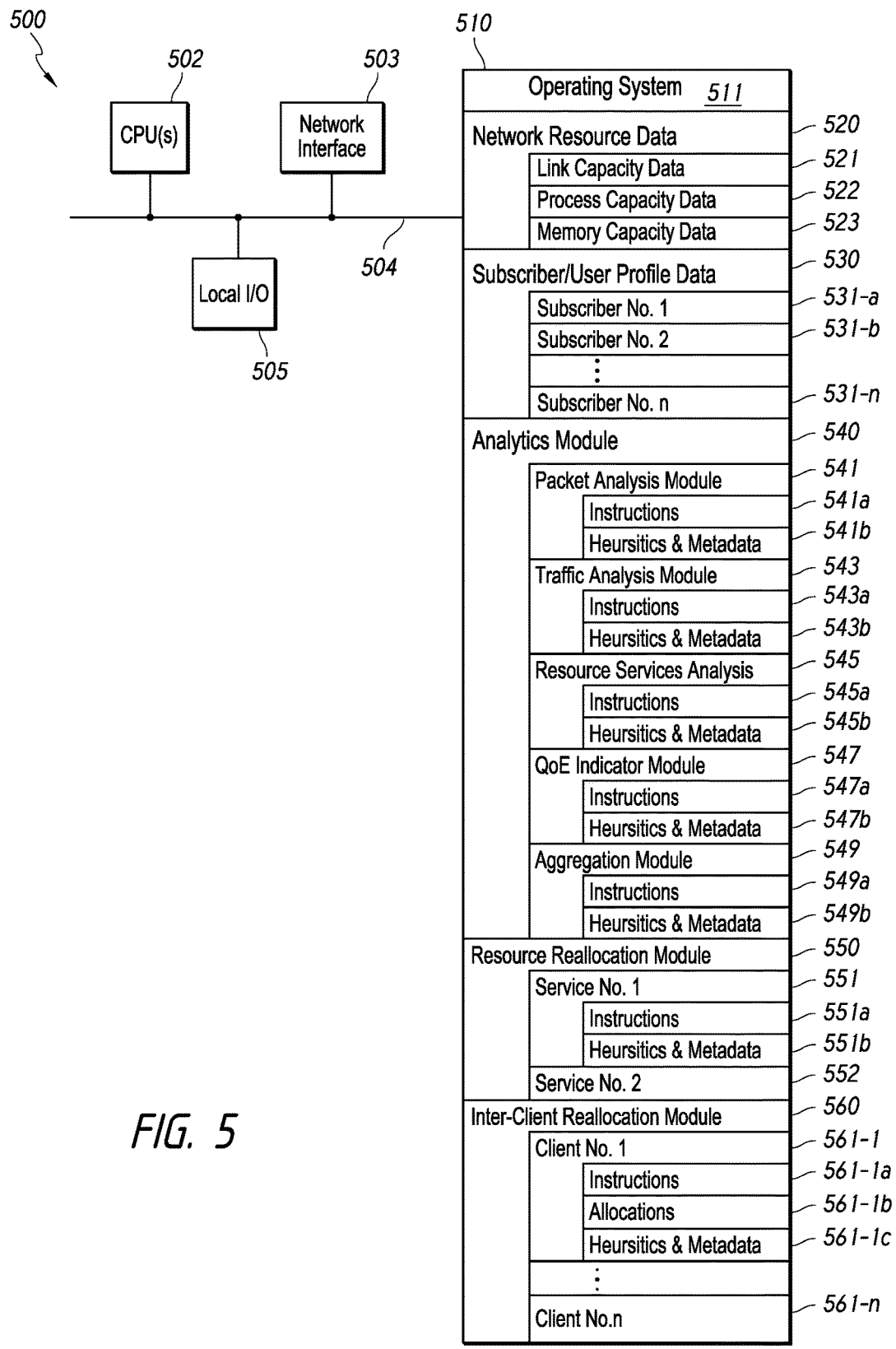
FIG. 5 is a block diagram of an example of a network resource management system in accordance with some implementations.

FIG. 5 is a block diagram of an example of a resource management system 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations the resource management system 500 includes one or more processing units (CPU's) 502, network interface 503, memory 510, local I/O interface 505, and one or more communication buses 504 interconnecting the aforementioned and other components.

In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium. Moreover, in some implementations, the memory 510 or the non-transitory computer readable storage medium of the memory 510 stores the following programs, modules and data structures, or a subset thereof including an optional operating system 511, network resource data 520, subscriber/user profile data 530, an analytics module 540, a resource reallocation module 550, and an inter-client reallocation module 560.

The operating system 511 includes procedures for handling various basic system services and for performing hardware dependent tasks.

In some implementations, the network resource data 520 includes data associated with one or more shared network resources (e.g., bandwidth, processor time, memory, etc.). For example, as shown in FIG. 5, in some implementations, the network resource data 520 includes link capacity data 521, processor capacity data 522, and memory capacity data 523. In some implementations, the subscriber/user profile data 530 includes data associated with one or more subscriber gateway devices and/or subscriber client devices. For example, in some implementations, the subscriber/user profile data 530 includes subscriber policy limits for various client devices 531-a, 531b, . . . , 531-n. In some implementations, the subscriber policy limits and the like include the various levels of service that define a subscription tier model. For example, service levels define priority tiers, data throughput ranges, data throughput floors or ceilings, and degradation policies associated with the subscription tier model.

In some implementations, the analytics module 540 is configured to obtain and/or generate one or more shared-resource traffic quality indicator values, such as an aggregate QoE metric characterizing a distribution of QoE levels for each of the client devices sharing the one or more shared network resources as described above. As shown in FIG. 5, the analytics module 540 includes a packet analysis module 541, a traffic analysis module 543, a resource services analysis module 545, a QoE indicator module 547, and an aggregation module 549. In some implementations, the packet analysis module 541 is configured to perform deep packet inspection of packets sent to and/or from client devices in order to determine at least one of encoding rates of segment representations and QoE indicator values. To that end, the packet analysis module 541 includes instructions 541a, and heuristics and metadata 541b. In some implementations, the traffic analysis module 543 is configured to monitor network traffic to and/or from client devices in order to generate resource allocation utilization values for corresponding client devices and/or subscriber gateways. Additionally and/or alternatively, in some implementations, the traffic analysis module 543 is configured to and request and receive resource allocation utilization values from at least some client devices and/or subscriber gateways. To that end, the traffic analysis module 543 includes instructions 543a, and heuristics and metadata 543b. In some implementations, the resource services analysis module 545 is configured to determine relative resource utilization values for resource allocations provided for corresponding services. To that end, the resource services analysis module 545 includes instructions 545a, and heuristics and metadata 545b. In some implementations, the QoE indicator module 547 is configured to assess QoE levels from a number of client devices sharing a network resource. For example, in some implementations, the QoE indicator module 547 is configured to produce one or more QoE distribution indicator values that characterize at least in part the relative QoE values associated with a plurality of client devices sharing a network resource as described below with reference to FIG. 7. To that end, the QoE indicator module 547 includes instructions 547a, and heuristics and metadata 547b. In some implementations, the aggregation module 549 is configured to determine aggregate QoE values and/or one or more QoE distribution indicator values. To that end, the aggregation module 549 includes instructions 549a, and heuristics and metadata 549b.

In some implementations, the resource reallocation module 550 is configured to manage the reallocation of a network resource between two or more services provided to two or more respective groups of client devices and/or subscriber gateway devices as described below with reference to FIGS. 8 and 9. In some implementations, the resource reallocation module 550 includes a respective sub-module to manage each service. For example, as shown in FIG. 5, the resource reallocation module 550 includes a first service sub-module 551 and a second service sub-module 552. Each service sub-module includes instructions and/or heuristics and metadata. For example, as shown in FIG. 5, the first service sub-module 551 includes instructions 551a, and heuristics and metadata 551b.

In some implementations, the inter-client reallocation module 560 is configured to manage the reallocation of network resources between two or more groups of client devices and/or groups of subscriber gateway devices. In some implementations, the inter-client reallocation module 560 includes a sub-module to manage each of the two or more groups of client devices and/or groups of subscriber gateway devices. For example, as shown in FIG. 5, the inter-client reallocation module 560 includes client device sub-modules 561-1, . . . , 561-n. Each client device sub-module includes instructions, resource allocation data and/or heuristics and metadata. For example, the first client device sub-module 561-1 includes instructions 561-1a, allocation data 561-1b, and heuristics and metadata 561-1c.

Figure 6:
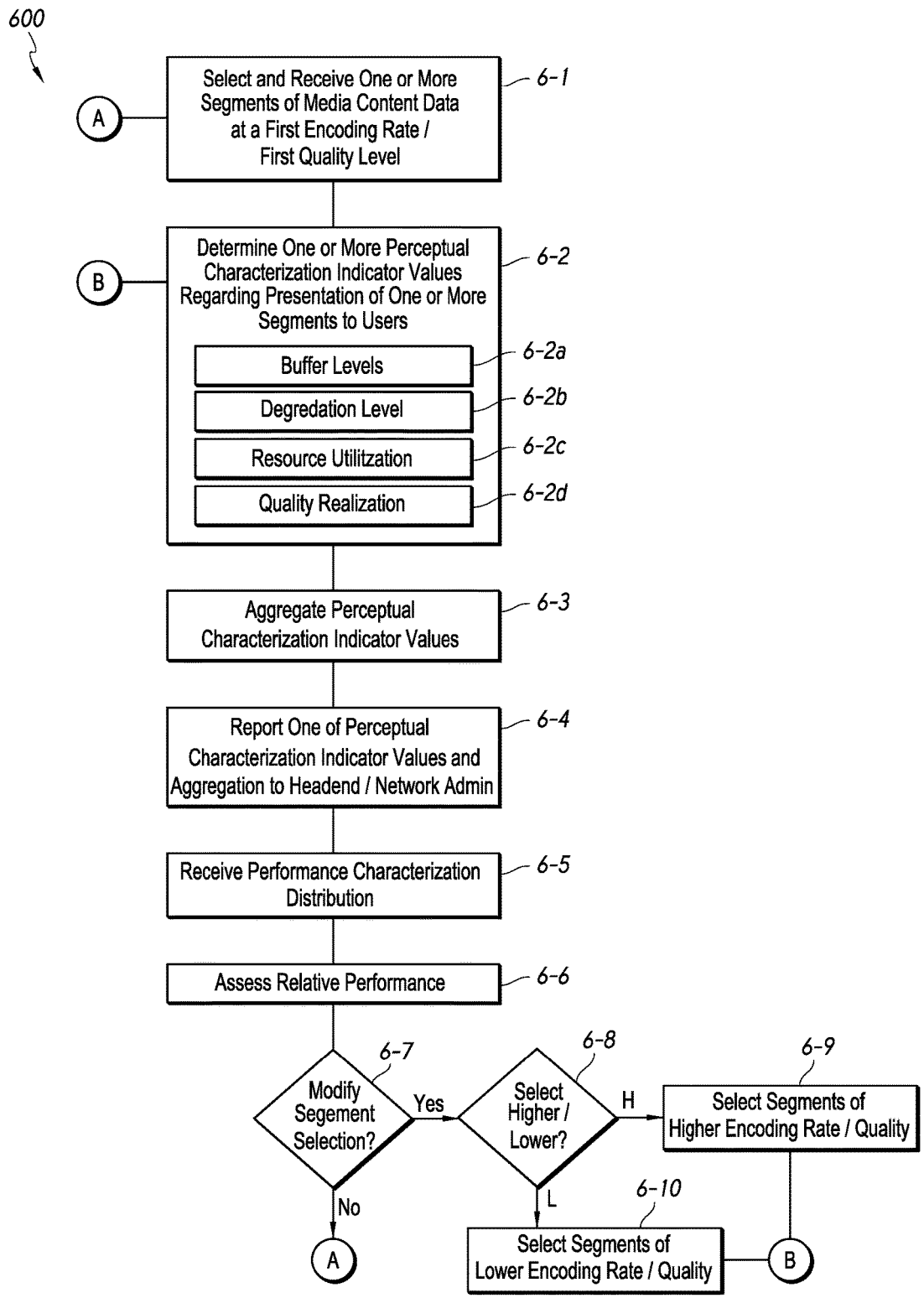
FIG. 6 is a flowchart representation of a method of cooperative adaptive bit rate streaming utilizing contextual quality indicators in accordance with some implementations.

FIG. 6 is a flowchart representation of a method 600 of cooperative adaptive bit rate (CABR) streaming utilizing QoE indicators in accordance with some implementations. In some implementations, the method 600 is separately performed by one or more client devices in order to cooperatively participate in the allocation and consumption of one or more shared network resources. In turn, in some implementations, the method 600 facilitates more evenly distributed perceptual playback quality levels within a subscription tier including the one or more client devices. Briefly, in operation a client device performing the method 600 determines a local QoE level value, and modifies a representation selection of media content data based at least on a combination of the local QoE level value and one or more QoE distribution indicator values. The local QoE level value characterizes perceptual playback quality of a representation of media content data received by the client device using a shared network resource. The one or more QoE distribution indicator values characterizes at least in part the relative QoE values associated with a plurality of client devices sharing the shared network resource with the client device.

To that end, as represented by block 6-1, the method 600 includes selecting and receiving one or more first segments of media content data at a first encoding rate and/or first quality level (i.e., segment representations). For example, with reference to FIGS. 1 and 2, client device 191 selects and receives a first segment representation of the media content data item 210 (e.g., a movie) from content server 130 as described above. As represented by block 6-2, the method 600 includes determining one or more perceptual characterization indicator values, such as perception metrics $\{p_i\}$, regarding the playback or presentation of the one or more first segments. For example, in some implementations, a perception metric $p_i$, includes a relative performance indicator associated with a performance criterion. Performance criteria include, without limitation, playback preference level, playback capability, degradation tolerance, one or more degradation policies, buffer level criteria, and a resource utilization criteria. In other words, a perception metric $p_i$, is also associated with at least one of a playback preference level, playback capability, degradation tolerance, one or more degradation policies, a buffer level criterion, and a resource utilization criterion associated with a client device.

As an example, as represented by block 6-2a, generating a perception metric $p_i$ includes obtaining a buffer level indicator value. The buffer level indicator value characterizes the utilization of a playout buffer in a client device. In some implementations, the buffer level indicator value provides an indication of the unavailable capacity or available capacity of the playout buffer. In some implementations, the buffer level indicator value approximates the time remaining before the playout buffer is empty. In some implementations, the buffer level indicator value provides at least one of an underflow indicator and overflow indicator.

In some implementations, as represented by block 6-2b, generating a perception metric $p_i$ includes determining a degradation level value, which quantitatively characterizes the degradation of media content data as experienced at a client device. In some implementations, the degradation level value is produced by a function of the ratio between a predetermined degradation tolerance level and the actual degradation experienced at the client device. Similarly, in some implementations generating a perception metric $p_i$ includes calculating one or more degradation indicator values based on one or more degradation policies associated with a subscription tier model. Degradation polices define how perceptual playback quality of media content data is permitted to degrade for a client device in a particular subscription tier under various network conditions.

In some implementations, as represented by block 6-2c, generating a perception metric $p_i$ includes calculating a resource utilization indicator value. The resource utilization indicator value characterizes how much of a resource a client device is using relative to the corresponding resource allocation provided to the client device in accordance with a subscription tier or the like.

In some implementations, as represented by block 6-2d, generating a perception metric $p_i$ includes determining a playback quality realization metric. The playback quality realization metric characterizes how closely a client device is able achieve a predetermined playback preference level based on current network conditions and the playback capabilities of the client device. For example, in some implementations, the playback quality realization metric is determined as a function of the ratio between a predetermined playback preference level for a client device and the actual playback level achieved by the client device based on the network conditions. In some implementations, the playback quality realization metric is determined as a function of the utilization of the playback capability of the device based on the network conditions. For example, based on the network conditions, a client device may be restricted to playing back a video stream at 720 p even though the client device is capable of playing back a video stream at 1080 p.

As represented by block 6-3, the method 600 includes aggregating the one or more perceptual characterization indicator values (e.g., one or more perception metrics $\{p_i\}$) in order to produce a local QoE level value for the client device. Accordingly, the local QoE level value provides a quantitative characterization of the perceptual playback quality of a representation of media content data received by the particular client device using one or more shared network resources. For example, in some implementations, aggregating includes generating a weighted combination (e.g., weighted sum, weighted average, etc.) of one or more perception metrics $\{p_i\}$ associated with the client device. In another example, in some implementations, aggregating includes generating a normalized combination (e.g., normalized sum, normalized average, etc.) of one or more perception metrics $\{p_i\}$ associated with the client device. As represented by block 6-4, the method 600 includes reporting at least one of the one or more perceptual characterization indicator values and the local QoE level value to a headend, a network administration node, and/or a network analytics module. In some implementations, the network administration node and/or a network analytics module includes a resource bottleneck point such a subscriber gateway device servicing two or more client devices or a core network component managing resources associated with one or more headend nodes. For example, with reference to FIG. 1, the client device 191 determines and transmits a respective local QoE level value to at least one of the gateway device 181 and the headend node 150. As represented by block 6-5, the method 600 includes receiving a performance characterization distribution. For example, with reference to FIG. 1, the client device 191 receives one or more QoE distribution indicator values from at least one of the gateway device 181 and the headend node 150. As noted above, the one or more QoE distribution indicator values characterize at least in part the relative QoE values associated with a plurality of client devices sharing the shared network resource with the client device. In some implementations, the one or more QoE distribution indicator values are determined from a statistical analysis of respective local QoE level values received from each of the client devices sharing a shared network resource. In some implementations, the one or more QoE distribution indicator values are determined from a statistical analysis of respective sets of perceptual characterization indicator values received from each of the client devices sharing a shared network resource.

As represented by block 6-6, the method 600 includes the client device assessing the relative performance of the local QoE level value against the one or more QoE distribution indicator values in order to determine whether or not, and when applicable how, to modify subsequent segment representation selections of media content data. To that end, according to various implementations, a CABR-enabled client device generally operates in a manner that is contrary to previously known ABR-enabled client devices. In particular, CABR-enabled client devices do not share the conventional ABR operating bias of simply consuming more of a shared resource as it becomes available. Rather, based on a QoE-based level of service assessment, a CABR-enabled client device operates differently in at least two ways. First, in some implementations, a CABR-enabled client device is configured to coordinate with a network controller to reduce or limit its own allocation demand of a shared network resource used to satisfy a preferred QoE-based level of service for a particular content stream. In turn, the CABR-enabled client device operates to request additional allocations of a shared resource when the additional allocation results in a substantial threshold improvement, and not merely a marginal improvement, in perceptual playback quality. Second, in some implementations, a CABR-enabled client device is configured to raise or lower its own perceptual playback quality level (or QoE level value) in order to facilitate more evenly distributed perceptual playback quality levels within the subscription tier including the CABR-enabled client device. In other words, a CABR-enabled client device is configured to cooperatively share one or more network resources with other CABR-enabled client devices in a subscription tier.

As represented by block 6-7, the method 600 includes determining whether or not to modify a segment representation selection based on relative performance assessment. For example, if the relative performance of the client device substantially satisfies the performance criteria for a subscription tier and/or a preferred level, the segment representation selection does not change. In turn, the method 600 ("No" path from block 6-7) circles back to the portion of the method represented by block 6-1 (or ends for an assessment cycle), and the respective allocations of the one or more shared network resources provided to the client device remain substantially unchanged. On the other hand, if the relative performance of the client device is either too high or too low as compared to a performance criterion, then the segment representation selection is subject to change. Thus, when modification of segment representation selection is warranted based on the assessment of relative performance ("Yes" path from block 6-7), as represented by block 6-8, the method 600 includes determining whether to select a higher bit-rate segment representation or a lower bit-rate segment representation. In some implementations, a higher bit-rate segment representation is selected when the relative performance of the client device fails to achieve the performance criteria for a subscription tier and/or a preferred level as chosen by a user. Similarly, a lower bit-rate segment representation is selected when the relative performance of the client device substantially exceeds the performance criteria for a subscription tier and/or a preferred level as chosen by a user. Accordingly, if selection of a higher bit-rate segment representation is determined ("H" path from block 6-8), as represented by block 6-9, the method 600 includes selecting one or more segments of a higher encoding rate and/or quality. On the other hand, if selection of a lower bit-rate segment representation is determined ("L" path from block 6-8), as represented by block 6-10, the method 600 includes selecting one or more segments of a lower encoding rate and/or quality. Following blocks 6-9 and 6-10, the method 600 circles back to the portion of the method represented by block 6-2 (or ends for an assessment cycle).

Figure 7:
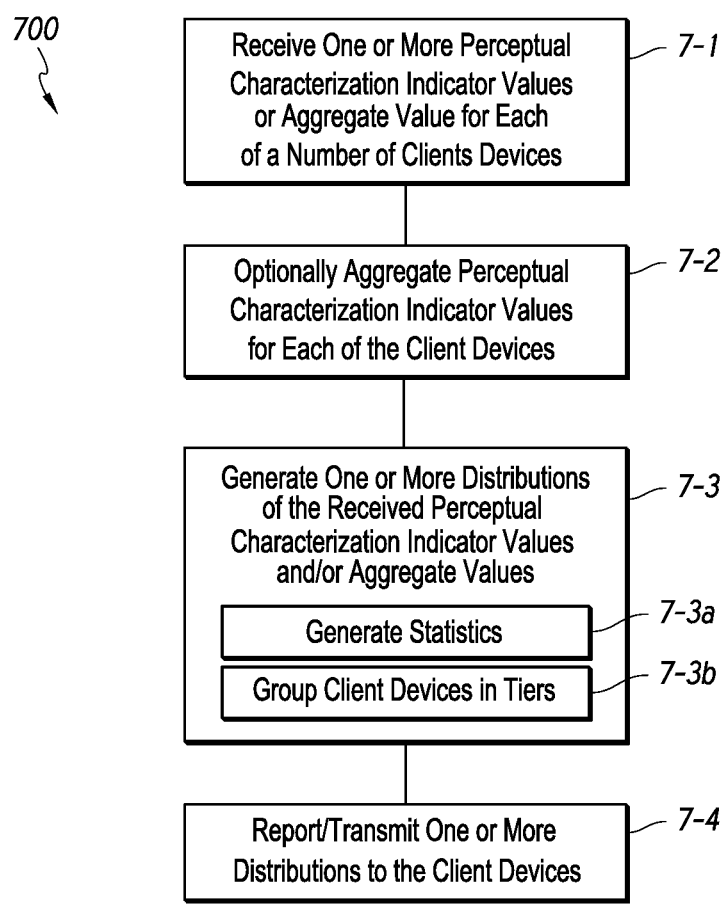
FIG. 7 is a flowchart representation of a method of generating one or more distributions of contextual quality indicators in accordance with some implementations.

FIG. 7 is a flowchart representation of a method 700 of generating one or more QoE distribution indicator values in accordance with some implementations. In some implementations, the method 700 is performed by at least one of a headend node, a network administration node and an analytics module associated with a resource bottleneck. Briefly, the method 700 includes using statistical analysis to generate one or more QoE distribution indicator values from respective local QoE level values received from each of the client devices sharing the shared network resource, and/or from respective sets of perceptual characterization indicator values received from each of the client devices sharing the shared network resource.

To that end, as represented by block 7-1, the method 700 includes receiving respective sets of one or more perceptual characterization indicator values and/or respective aggregate values (e.g., local QoE level values) from a number of client devices sharing one or more shared network resources. For example, with reference to FIG. 1, one of the analytics modules 143, 152, receives respective local QoE level values from the client devices 191, 192, 193a, 193b, 194, 195. In another example, the analytics module 181a receives respective sets of one or more perceptual characterization indicator values from the client devices 191, 192, 193a, 193b, 194 that share an allocation of bandwidth provided through gateway device 181.

As represented by block 7-2, the method 700 optionally includes aggregating the respective sets of one or more perceptual characterization indicator values received from the client devices. In some implementations, aggregating includes generating value grouping for each type of perceptual characterization indicator value received in the sets. For example, in some implementations, value groupings include groupings for playback preference level, playback capability, degradation tolerance, one or more degradation policies, a buffer level criterion, and a resource utilization criterion. In some implementations, aggregating includes determining a respective QoE level value for each client device based on at least a subset of one or more perceptual characterization indicator values received from the client devices. As such, in some implementations, the analytics module is able to define and/or control for the criteria that may be more pertinent to a particular implementation or network conditions. In some implementations, the analytics module is also configured to determine respective QoE level values by selecting the same types of perceptual characterization indicator values to determine each QoE level value.

As represented by block 7-3, the method 700 includes generating one of more distributions of the received sets of one or more perceptual characterization indicator values and/or aggregate values (e.g., respective local QoE values).

For example, as represented by block 7-3a, the method includes generating one or more characterizing statistics and/or applying a curve fitting method to the received sets of one or more perceptual characterization indicator values and/or aggregate values. Examples of various statistics and characterizing values include mean, media, mode, particularly relevant percentiles or groups of percentiles, upper and lower bounds (e.g., minimums and maximums), standard deviation and variance. In another example, as represented by block 7-3b, in some implementations, generating the one or more one of more distributions includes generating distributions specific to client device subscription tiers. Subsequently, as represented by block 7-4, the method includes reporting and/or transmitting the one or more distributions to the client devices cooperatively participating in the allocation and consumption of the one or more shared network resources.

In some implementations CABR-enabled client devices and conventional ABR-enabled client devices are provided access to the same one or more shared network resources. For example, FIG. 8 is a block diagram of a data communication environment 800 in which CABR-enabled client devices and conventional ABR-enabled client devices share access to the same one or more shared network resources. The data communication environment 800 of FIG. 8 is similar to and adapted from the data communication environment 100 of FIG. 1. Elements common to each include common reference numbers, and only the differences between FIGS. 1 and 8 are described herein for the sake of brevity.

Figure 8:
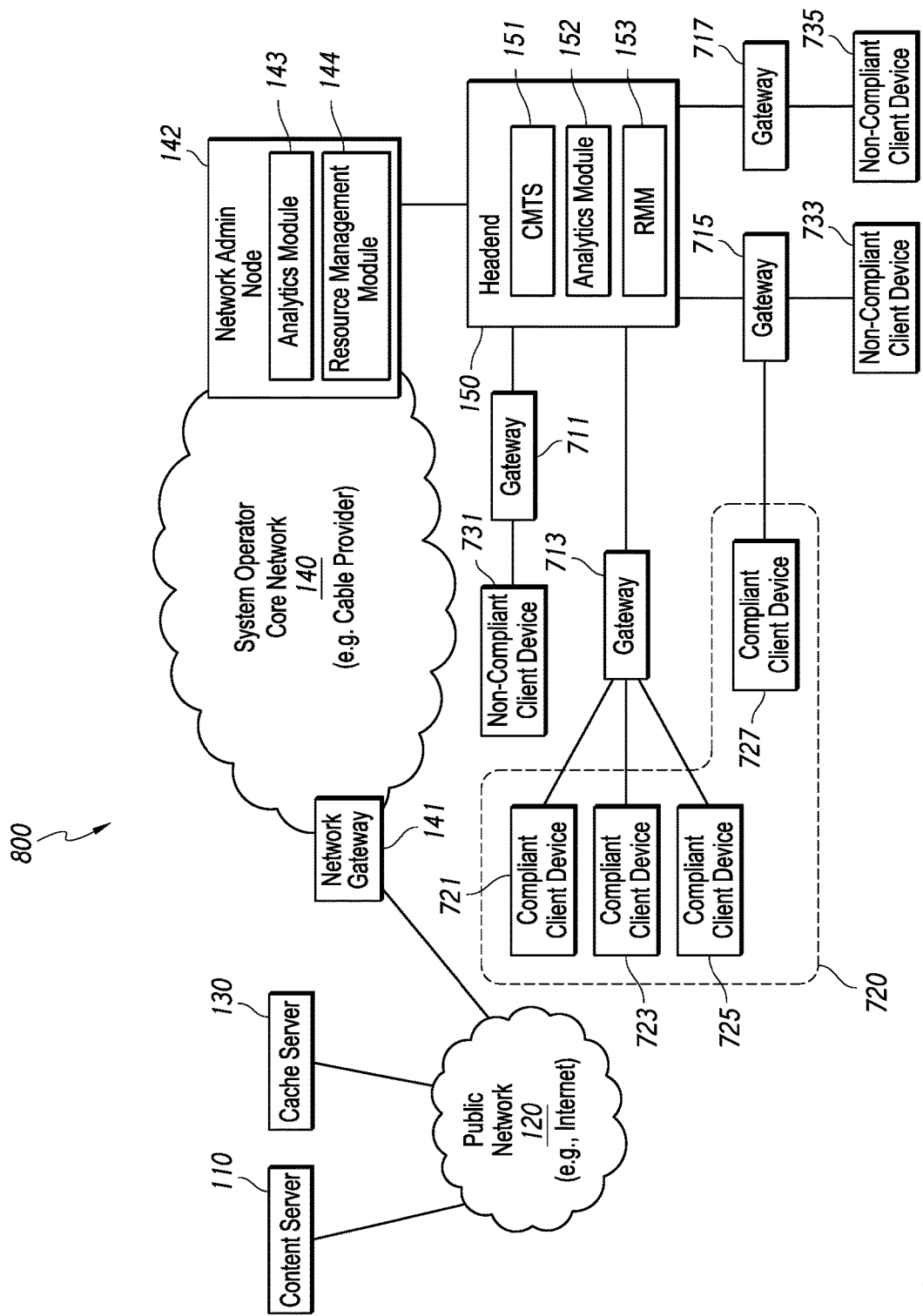
FIG. 8 is a block diagram of a data communication environment in accordance with some implementations.

To that end, as compared to FIG. 1, the data communication environment 800 of FIG. 8 includes four gateway devices 711, 713, 715, 717 coupled to the headend node 150. As described above, each of the three gateway devices 711, 713, 715, 717 services one or more client devices. Each client devices is either a CABR-enabled client device (i.e., a compliant client device) or an ABR-enabled client device (i.e., a non-compliant client device). More specifically, first non-compliant client device 731 is coupled to and receives service from the first gateway device 711. Compliant client devices 721, 723, 725 are coupled to and receive service from the second gateway device 713. Compliant client device 727 and non-compliant client device 733 are coupled to and receive service from the third gateway device 715. And non-compliant client device 735 is coupled to and receives service from the fourth gateway device 717.

In operation, without sufficient network management, the conventional ABR-enabled client devices could seize disproportionate shares of the one or more shared network resources from the CABR-enabled client devices. Thus, the CABR-enabled client devices would be deprived from equitable access to the one or more shared network resources. In order to address this issue, in some implementations, a network controller (e.g., the resource management module 153 of FIG. 8) is configured to create at least two virtual pools for each of the one or more shared network resources. Each pool is treated as a substantially fixed allocation of a shared network resource that is accessible to devices assigned to the pool. For example, a first pool 720 provides a first shared allocation of bandwidth (or another resource) to CABR-enabled client devices 721, 723, 725, 727 (i.e., the compliant devices). A second pool provides a second shared allocation of bandwidth (or another resource) to the conventional ABR-enabled client devices 731, 733, 735 (i.e., the non-compliant devices). Since the two pools are managed separately, conventional ABR-enabled client devices are not able to withhold disproportionate shares of the shared bandwidth from CABR-enabled client devices.

Figure 9:
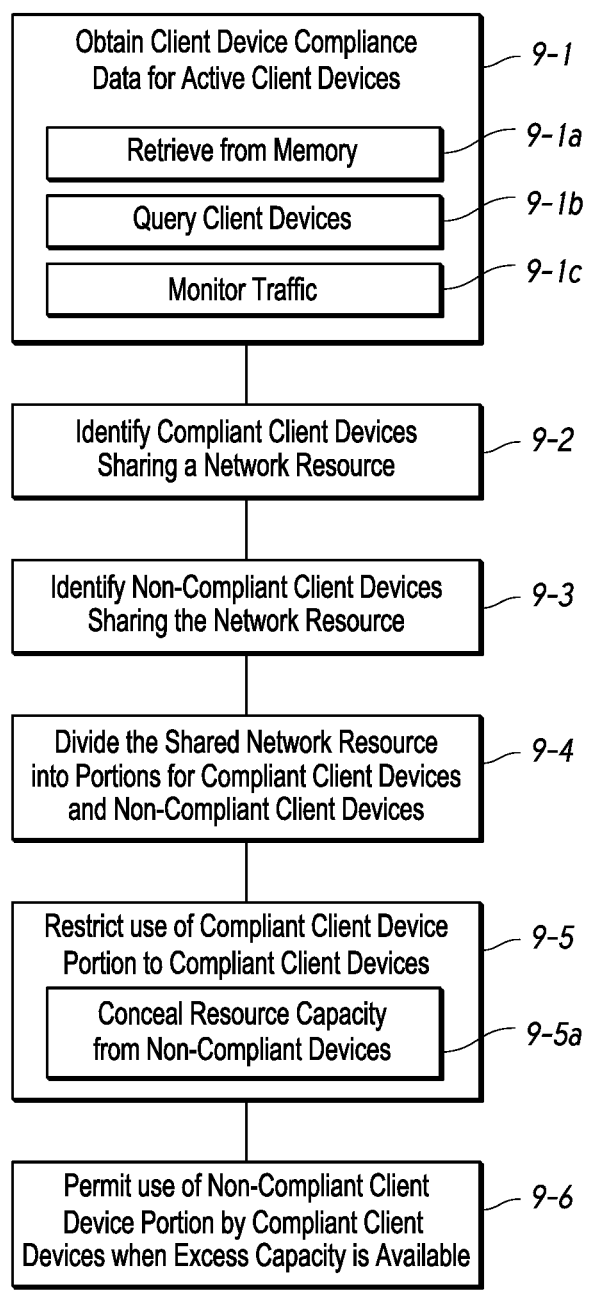
FIG. 9 is a flowchart representation of a method of managing compliant and non-compliant client device groups using contextual quality indicators in accordance with some implementations.

FIG. 9 is a flowchart representation of a method 900 of managing compliant and non-compliant client device groups in accordance with some implementations. In some implementations, the method 900 is performed by at least one of a headend node, a network administration node and an analytics module associated with a resource bottleneck. Briefly, the method 900 includes determining which client devices sharing a network resource are compliant client devices (e.g., CABR-enabled), and restricting the use of a portion of the shared network resource to the compliant client devices.

To that end, as represented by block 9-1, the method 900 includes obtaining client device compliance data for active client devices sharing one or more shared network resources. For example, as represented by block 9-1a, obtaining client device compliance data includes retrieving the data from a non-transitory memory or computer readable medium. In some implementations, as represented by block 9-1b, obtaining client device compliance data includes querying the active client devices sharing one or more shared network resources. In some implementations, as represented by block 9-1c, obtaining client device compliance data includes monitoring network traffic in order to determine which of the active client devices are operating in accordance with a CABR method. As represented by block 9-2, the method 900 includes identifying which of the active client devices are compliant client devices from the client device compliance data. As represented by block 9-3, the method 900 includes identifying which of the active client devices are non-compliant client devices from the client device compliance data. As represented by block 9-4, the method 900 includes dividing a shared resource into at least two portions—a first portion is provided for compliant client devices and a second portion is provided for non-compliant client devices. As represented by block 9-5, the method 900 includes restricting the use of the compliant device portion to compliant devices. For example, in some implementations, as represented by block 9-5a, the method 900 includes concealing resource capacity reserved for the compliant devices from non-compliant devices. As represented by block 9-6, the method 900 includes permitting compliant client devices to use at least some of the second portion nominally reserved for the non-compliant devices when excess capacity is available in the second portion.

In some implementations, resource management/reallocation between two or more groups of clients (e.g., non-compliant vs. compliant) can also be adjusted periodically based on the relative QoE aggregate performance of the groups. For example, if a system controller starts off with an equal allocation of a resource (e.g., 50-50) to the two virtual pools of clients, and later determines that the non-compliant clients is enjoying a substantially higher average (or median) QoE value, the system controller can reallocate the resource in favor of the compliant clients (e.g., to a ratio of 40-60 in favor of CABR-enabled clients). Conversely, if the group of CABR-enabled clients have a significantly higher average (or median) QoE value than the non-compliant client, the system controller can reallocate the resource in favor of the non-compliant clients.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
identifying first and second types of client devices sharing a shared network resource, wherein the first type of client devices is characterized by how a client device of the first type shares or does not share the shared network resource in order to satisfy a first quality of experience (QoE) performance criterion that is associated with a first perceptual characterization indicator value, and wherein the second type of client devices is characterized by how a client device of the second type shares or does not share the shared network resource in order to satisfy a second QoE performance criterion that is associated with a second perceptual characterization indicator value;

allocating a first portion of the shared network resource to the first type of client devices; and allocating a second portion of the shared network resource to the second type of client devices, wherein the second type of client devices are restricted from utilizing the first portion of the shared network resource.

2. The method of claim 1, wherein identifying the first and second types of client devices includes obtaining client device compliance data.

3. The method of claim 2, wherein obtaining the client device compliance data includes at least one of retrieving the data from a non-transitory memory, monitoring network traffic, or querying the client devices sharing the shared network resource.

4. The method of claim 1, wherein the first portion of the shared network resource is concealed from the second type of client devices.

5. The method of claim 1, further comprising permitting the first type of client devices to utilize available portions of the second portion of the shared network resource.

6. The method of claim 1, further comprising adjusting the first and second portions based on the relative performance of the first type of client devices to the second type of client devices.

7. The method of claim 1, wherein the client devices of the first type are compliant with cooperative ABR (CABR) and the client devices of the second type are not compliant with CABR.

8. The method of claim 1, wherein the first QoE performance criterion and the second QoE performance criterion each includes at least one of a playback preference level, a playback capability, a degradation tolerance, one or more degradation policies, a buffer level criterion, or a resource utilization criterion.

9. A system comprising:
a network interface;
one or more processors; and
a non-transitory memory comprising instructions that, when executed, cause the one or more processors to:
identify first and second types of client devices sharing a shared network resource, wherein the first type of client devices is characterized by how a client device of the first type shares or does not share the shared network resource in order to satisfy a first quality of experience (QoE) performance criterion that is associated with a first perceptual characterization indicator value, and wherein the second type of client devices is characterized by how a client device of the second type shares or does not share the shared network resource in order to satisfy a second QoE performance criterion that is associated with a second perceptual characterization indicator value;
allocate a first portion of the shared network resource to the first type of client devices; and
allocate a second portion of the shared network resource to the second type of client devices, wherein the second type of client devices are restricted from utilizing the first portion of the shared network resource.

10. The system of claim 9, wherein the non-transitory memory comprises further instructions that, when executed, cause the one or more processors to obtain client device compliance data in order to identify the first and second types of client devices.

11. The system of claim 10, wherein the client device compliance data is obtained by at least one of retrieving the data from the non-transitory memory, monitoring network traffic, or querying the client devices sharing the shared network resource.

12. The system of claim 9, wherein the first portion of the shared network resource is concealed from the second type of client devices.

13. The system of claim 9, wherein the non-transitory memory comprises further instructions that, when executed, cause the one or more processors to permit the first type of client devices to utilize available portions of the second portion of the shared network resource.

14. The system of claim 9, wherein the non-transitory memory comprises further instructions that, when executed, cause the one or more processors to adjust the first and second portions based on the relative performance of the first type of client devices to the second type of client devices.

15. A non-transitory computer readable medium storing one or more programs, which, when executed by one or more processors of a device, cause the device to:
identify first and second types of client devices sharing a shared network resource, wherein the first type of client devices is characterized by how a client device of the first type shares or does not share the shared network resource in order to satisfy a first quality of experience (QoE) performance criterion that is associated with a first perceptual characterization indicator value, and wherein the second type of client devices is characterized by how a client device of the second type shares or does not share the shared network resource in order to satisfy a second QoE performance criterion that is associated with a second perceptual characterization indicator value;
allocate a first portion of the shared network resource to the first type of client devices; and
allocate a second portion of the shared network resource to the second type of client devices, wherein the second type of client devices are restricted from utilizing the first portion of the shared network resource.

16. The non-transitory computer readable medium of claim 15, wherein the one or more programs, when executed, cause the device to obtain client device compliance data in order to identify the first and second types of client devices.

17. The non-transitory computer readable medium of claim 16, wherein the client device compliance data is obtained by at least one of retrieving the data from a non-transitory memory, monitoring network traffic, or querying the client devices sharing the shared network resource.

18. The non-transitory computer readable medium of claim 15, wherein the first portion of the shared network resource is concealed from the second type of client devices.

19. The non-transitory computer readable medium of claim 15, wherein the one or more programs, when executed, cause the device to permit the first type of client devices to utilize available portions of the second portion of the shared network resource.

20. The non-transitory computer readable medium of claim 15, wherein the one or more programs, when executed, cause the device to adjust the first and second portions based on the relative performance of the first type of client devices to the second type of client devices.

* * * * *